Aug. 18, 1959     A. E. PICKFORD     2,900,173
PASS-RIB GASKET FOR HEAT EXCHANGER
Filed Feb. 18, 1957
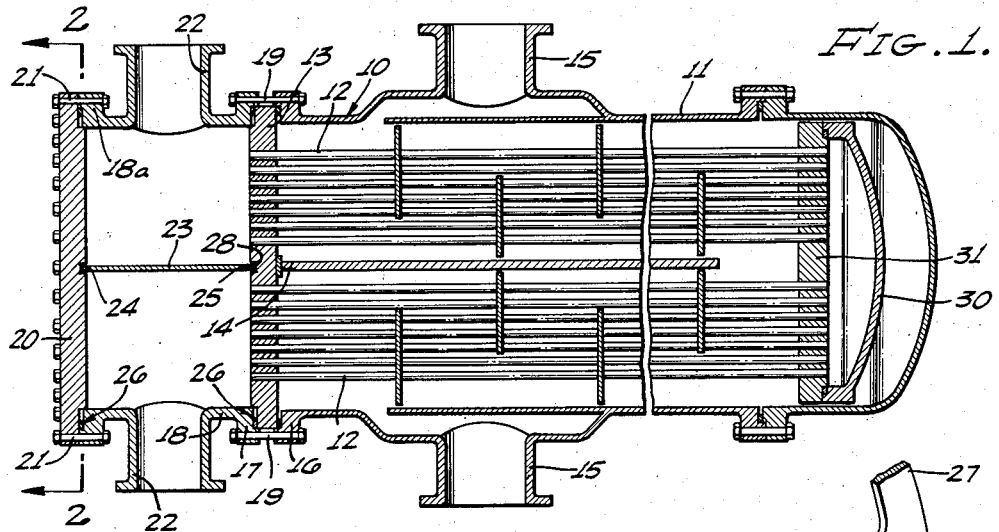
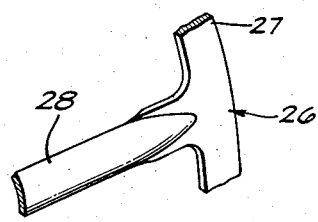
FIG. 4.
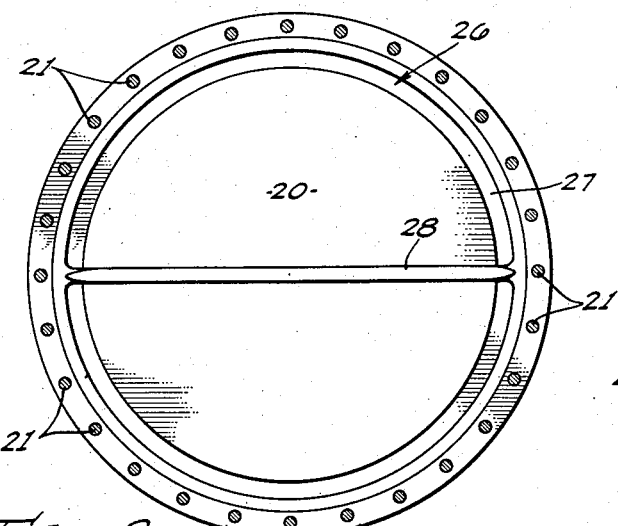
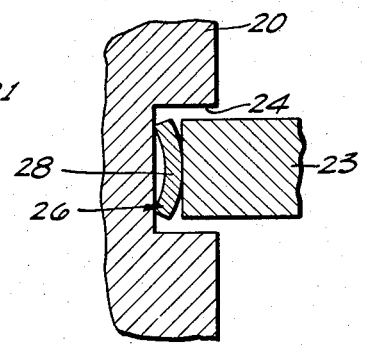
FIG. 3.
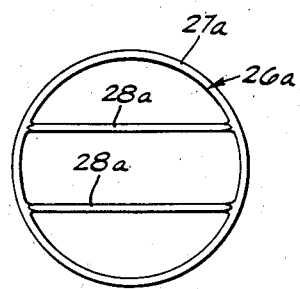
FIG. 5.
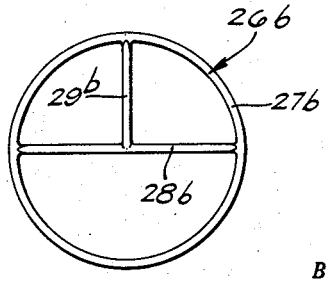
FIG. 6.
ALLAN E. PICKFORD
INVENTOR.
BY Lyon & Lyon
ATTORNEYS United States Patent Office 2,900,173
Patented Aug. 18, 1959

2,900,173

PASS-RIB GASKET FOR HEAT EXCHANGER

Allan E. Pickford, Arcadia, Calif., assignor to C. F. Braun & Co., Alhambra, Calif., a corporation of California Application February 18, 1957, Serial No. 640,856

10 Claims. (Cl. 257—239)

This invention relates to heat exchangers of the shell-and-tube type and is particularly directed to improvements in sealing certain joints therein to prevent by-passing of fluid.

Heat exchangers of the shell-and-tube type are commonly provided with a tubesheet having a plurality of open tubes fixed therein. The tubesheet is clamp bolted to one end of an annular housing or distributor known in the art as a "channel.". A closure known in the art as a "channel-cover" is bolted to the other end of the channel. At least one pass-rib is provided within the channel to divide the space into two or more chambers. Inlet and outlet connections communicate with the chambers to direct flow of fluid through the open ended tubes fixed in the tubesheet.

Pressure of fluid within the chambers in the channel causes the channel-cover to bow or deflect. This has an adverse effect upon the seal between the pass-rib and the channel-cover and between the pass-rib and the tubesheet with the result that leakage is permitted to occur. A part of the fluid thus by-passes from one chamber to the other within the channel without passing through the tubes in the tubesheet.

The objectionable deflection of the channel-cover is aggravated by stresses developed in bolting to the channel flange. Deflection of the tubesheet under internal pressure loading ordinarily is not aggravated by bolting loads, because the tubesheet is usually clamped between flanges on the channel and shell. Furthermore, the magnitude of the tubesheet deflection is diminished by the bracing effect of the tubes. Nevertheless, deflection of the tubesheet does contribute to leakage around the pass-ribs.

To minimize the deflection of the channel-cover or tubesheet by increasing the thickness is not economically feasible. Accordingly, it is the principal object of my invention to eliminate or substantially reduce the by-pass leakage as described above, while permitting the channel-cover and tubesheet to deflect under load. Another object is to provide an improved form of gasket which permits deflection of the channel-cover or tubesheet to occur without any substantial increase in leakage. A more detailed object is to provide a gasket which is adapted to be clamped between the channel and the channel-cover and between the channel and the tubesheet and which gasket is provided with a cross bar transversely curved in cross section and contacting an edge of the pass-rib. Other and more detailed objects and advantages will appear hereinafter.

In the drawings:

Figure 1 is a longitudinal sectional view partly broken away showing a shell-and-tube heat exchanger of the type to which my invention pertains.

Figure 2 is a transverse sectional view taken substantially on the lines 2—2 as shown in Figure 1.

Figure 3 is a sectional detail on an enlarged scale.

Figure 4 is a perspective view partly broken away.

Figure 5 shows a modified form of gasket.

Figure 6 shows a further modification.

Referring to the drawings, the heat exchanger, generally designated 10 includes a shell 11 enclosing a bundle of tubes 12. The tubes 12 are open ended and one end of each is fixed to a tubesheet 13. In the particular construction illustrated, a longbaffle 14 extends longitudinally within the shell 11 to divide the interior thereof into two compartments. Fluid enters the shell through one of the nozzles 15 and passes through the shell in a zigzag path on one side of the longbaffle 14 and then on the other side thereof and is discharged through the other nozzle 15.

The shell 11 is provided with a flange 16 and a similar flange 17 is formed on the annular housing or channel 18. Bolts 19 engage the flanges 16 and 17 to clamp the outer rim of the tubesheet 13 therebetween. A circular plate or channel-cover 20 is connected by bolts 21 to the flange 18a on the channel 18. Fluid enters the interior of the channel 18 through one of the nozzles 22 and is discharged through the other nozzle 22 after passing through the tubes 12. The space within the channel 18 is divided into two or more chambers by means of one or more pass-ribs 23. A single pass-rib is shown in Figure 1 of the drawings and this extends diametrically across the space within the channel 18 to provide two chambers of approximately equal size. Fluid in one of these chambers passes into the open ended tubes 12 which communicate with it and the return flow of fluid in the other tubes is delivered into the other chamber.

The pass-rib 23 is provided with parallel edges which are received within the grooves 24 and 25 provided in the channel-cover 20 and tubesheet 13 respectively. In accordance with my invention, I place a gasket 26 at each end of the channel 18. These gaskets are substantially duplicates. Each is preferably formed of metal and constitutes an annular ring 27 having one or more integral cross bars 28. The cross bars 28 are received in the grooves 24 and 25 respectively. The cross bar in unstressed condition is transversely curved in cross section as viewed in Figure 3 but is clamped and flattened between the edge of the pass-rib 23 and the bottom of the groove 24 or 25. When the channel-cover 20 or tubesheet 13 deflects under internal pressure within the channel-cover 18 and the effect of the bolt loading, the cross bar returns from flattened to a curved shape to maintain the seal at the edges of the pass-rib 23. The cross bar 28 is thus resilient by reason of its shape and material and is able to follow the deflection of the parts. By-pass leakage around the edges of the pass-rib 23 is thereby substantially limited or materially reduced.

The modified form of gasket 26 as shown in Figure 5 includes a flat ring portion 27a and a pair of parallel cross bars 28a. This form of gasket is used when a pair of pass-ribs are employed within the channel in order to produce four passes within the tubes instead of two. The integral cross bars 28 are cupped or curved in cross section in a manner similar to that described above. The modified form of gasket 26b shown in Figure 6 includes a flat ring 27b and a pair of cross bars 28b and 29b. The cross bar 28b is similar to the cross bar 28 previously described and the cross bar 29b extends from the ring 27b to join the cross bar 28b at right angles. Both cross bars 28b and 29b are curved in cross section as shown in Figure 4. The gasket 26b is used when two pass-ribs at right angles are used to cause four passes in the tubes instead of two.

Other cross-bars may be placed within the gasket ring to conform to the position of pass-ribs for producing any desired number of passes in the tubes. Furthermore, pass-ribs and gaskets of the type described may be employed between the floating head 30 and the floating head tubesheet 31 when more than two passes are made in the tubes. Thus when four passes are required, and when pass-ribs are employed in the channel 18 which require gaskets of the shape illustrated in Figures 5 or 6, the parts 30 and 31 are equipped with a single pass-rib and a gasket of the type shown in Figure 2.

Having fully described my invention, it is to be understood that I do not wish to be limited to the details herein set forth, but my invention is of the full scope of the appended claims.

I claim:

1. For use in a shell-and-tube heat exchanger having a flanged channel bolted at one end to a channel-cover member and bolted at the other end to clamp a tubesheet member, and having at least one pass-rib positioned within the channel between the members, the improvement comprising: a gasket having a flat ring adapted to be clamped between the channel and one of said members, the gasket also having at least one integral cross bar extending across the ring, the cross bar being transversely curved in cross section and having a side thereof adapted to contact an edge of the pass-rib.

2. The device set forth in claim 1 in which a single cross bar extends diametrically across the center of the ring.

3. The device set forth in claim 1 in which a plurality of parallel cross bars extend as chords across the ring and are formed integrally therewith, and each adapted to contact a pass-rib.

4. The device set forth in claim 1 in which a divider bar extends from the ring to join integrally with the said cross bar at a location between its ends, the cross bar and divider bar each adapted to contact a pass-rib.

5. In a heat exchanger of the shell-and-tube type, the combination of: a flanged channel, a tubesheet member clamp bolted to the channel at one end thereof, a channel-cover member bolted to the channel at the other end thereof, at least one pass-rib positioned within the channel and extending between the channel-cover member and the tubesheet member, a metal gasket having a flat ring adapted to be clamped between the flanged channel and one of said members, the gasket also having at least one integral cross bar extending across the ring, the cross bar in unstressed condition being transversely curved in cross section and being clamped and flattened between the latter said member and an edge of the pass-rib to form a seal, whereby deflection of the said member under pressure of fluid within the channel permits the cross bar to return from flattened toward curved cross section to maintain the seal.

6. The combination set forth in claim 5 wherein a single cross bar extends diametrically across the center of the ring.

7. The combination set forth in claim 5 wherein a plurality of parallel cross bars extend as chords across the ring and are formed integrally therewith, and each contacting a pass-rib.

8. The combination set forth in claim 5 wherein a divider bar extends from the ring to join integrally with the said cross bar at a location between its ends, the cross bar and divider bar each contacting a pass-rib.

9. In a heat exchanger of the shell-and-tube type, the combination of: a flanged channel, a channel-cover bolted to the channel at one end thereof, a pass-rib positioned within the channel, a metal gasket having a flat ring adapted to be clamped between the flanged channel and the channel-cover, the gasket also having an integral cross bar extending across the ring, the cross bar in unstressed condition being transversely curved in cross section and being clamped and flattened between the channel-cover and an edge of the pass-rib to form a seal, whereby deflection of the said channel cover under pressure of fluid within the channel permits the cross bar to return from flattened toward curved cross section to maintain the seal.

10. In a heat exchanger of the shell-and-tube type, the combination of: a flanged channel, a tubesheet clamp bolted to the channel at one end thereof, a pass-rib positioned within the channel, a metal gasket having a flat ring adapted to be clamped between the flanged channel and said tubesheet, the gasket having an integral cross bar extending across the ring, the cross bar in unstressed condition being transversely curved in cross section and being clamped and flattened between the tubesheet and an edge of the pass-rib to form a seal, whereby deflection of the said tubesheet under pressure of fluid within the channel permits the cross bar to return from flattened toward curved cross section to maintain the seal.

References Cited in the file of this patent

UNITED STATES PATENTS

| | | |
|---|---|---|
| 1,803,034 | Potter | Apr. 28, 1931 |
| 1,842,945 | Price | Jan. 26, 1932 |
| 2,064,140 | Appleton | Dec. 15, 1936 |
| 2,213,410 | Rathbun | Sept. 3, 1940 |
| 2,247,105 | Tinker | June 24, 1941 |
| 2,292,524 | Jacocks | Aug. 11, 1942 |